(12) United States Patent
D'Angelo (10) Patent No.: US 9,063,557 B2
(45) Date of Patent: *Jun. 23, 2015

(54) OPERATIONAL TRANSCONDUCTANCE AMPLIFIER FEEDBACK MECHANISM FOR FIXED FEEDBACK VOLTAGE REGULATORS

(71) Applicant: ADVANCED ANALOGIC TECHNOLOGIES INCORPORATED, Santa Clara, CA (US)

(72) Inventor: Kevin D'Angelo, Santa Clara, CA (US)

(73) Assignee: ADVANCED ANALOGIC TECHNOLOGIES INCORPORATED, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/021,579

(22) Filed: Sep. 9, 2013

(65) Prior Publication Data

US 2014/0042997 A1    Feb. 13, 2014

Related U.S. Application Data

(63) Continuation of application No. 13/079,734, filed on Apr. 4, 2011, now Pat. No. 8,531,164.

(51) Int. Cl.
*G05F 1/577* (2006.01)
*H05B 33/08* (2006.01)
(Continued)

(52) U.S. Cl.
CPC .............. *G05F 1/46* (2013.01); *H05B 33/0815* (2013.01); *H05B 33/0827* (2013.01); *H05B 33/0848* (2013.01); *H02M 3/156* (2013.01)

(58) Field of Classification Search
USPC .................. 323/266, 267, 268, 271, 299, 303; 315/185 R, 186, 297, 308, 312
See application file for complete search history.

(56) References Cited

U.S. PATENT DOCUMENTS 5,923,152 A    7/1999   Guerrera
6,271,651 B1   8/2001   Stratakos et al.
(Continued)

FOREIGN PATENT DOCUMENTS

WO    2007096868 A1    8/2007

OTHER PUBLICATIONS

Texas Instruments, Synchronous Buck Converter Design Using TPS56xx Controllers in SLVP10x EVMs User Guide, Sep. 1998.

*Primary Examiner* — Gary L Laxton
(74) *Attorney, Agent, or Firm* — Lando & Anastasi, LLP (57) ABSTRACT

An operational transconductance amplifier used in conjunction with a multiple chip voltage feedback technique allows multiple strings of LEDs and current sinks to be efficiently powered by a simple feedback oriented voltage regulator within an appliance. A connected series of differential amplifiers or multiplexors are used to monitor the voltages between the connected LEDs and the current sinks, in order to progressively determine the lowest voltage. The operational transconductance amplifier compares this voltage to a reference voltage and injects or removes current from the feedback node of a voltage regulator, thereby altering the voltage present at the feedback node. This causes the voltage regulator to adjust its output, ensuring that the current sinks of the LED strings have adequate voltage with which to function, even as the LEDs have different forward voltages and the strings are asynchronously enabled and disabled.

20 Claims, 5 Drawing Sheets

(51) Int. Cl.
*G05F 1/46* (2006.01)
*H02M 3/156* (2006.01)

(56) References Cited

U.S. PATENT DOCUMENTS

| | | |
|---|---|---|
| 6,864,641 B2 | 3/2005 | Dygert |
| 7,116,086 B2 * | 10/2006 | Burgyan et al. ............... 323/271 |
| 7,235,954 B2 | 6/2007 | Murakami |
| 7,777,704 B2 * | 8/2010 | S et al. ............................ 345/82 |
| 7,990,119 B2 | 8/2011 | Petty |
| 8,179,051 B2 | 5/2012 | Zhao |
| 8,531,164 B2 * | 9/2013 | D'Angelo ..................... 323/267 |
| 2003/0090246 A1 | 5/2003 | Shenai et al. |
| 2004/0135522 A1 | 7/2004 | Berman et al. |
| 2006/0028150 A1 | 2/2006 | Vitunic et al. |
| 2006/0108933 A1 | 5/2006 | Chen |
| 2008/0258636 A1 | 10/2008 | Shih et al. |
| 2009/0102444 A1 * | 4/2009 | Nonaka ......................... 323/282 |
| 2009/0108776 A1 | 4/2009 | Zhao |
| 2009/0128045 A1 | 5/2009 | Szczeszynski et al. |
| 2009/0187925 A1 | 7/2009 | Hu et al. |
| 2009/0206808 A1 | 8/2009 | Wrathall |
| 2009/0230881 A1 | 9/2009 | Chen et al. |
| 2010/0019751 A1 * | 1/2010 | Chen et al. .................... 323/288 |
| 2010/0045210 A1 | 2/2010 | Hariharan |
| 2010/0156315 A1 | 6/2010 | Zhao et al. |
| 2010/0201278 A1 | 8/2010 | Zhao |
| 2013/0293208 A1 | 11/2013 | D'Angelo et al. |
| 2013/0300293 A1 | 11/2013 | D'Angelo et al. |
| 2013/0313996 A1 | 11/2013 | Williams |

* cited by examiner

Fig. 1

Prior Art

Fig. 2

Prior Art

Fig. 3

Prior Art

Fig. 4

Prior Art

Fig. 5

Prior Art

OPERATIONAL TRANSCONDUCTANCE AMPLIFIER FEEDBACK MECHANISM FOR FIXED FEEDBACK VOLTAGE REGULATORS

CROSS REFERENCE TO RELATED APPLICATIONS

This application claims the benefit under 35 U.S.C. §120 of U.S. application Ser. No. 13/079,734, titled "OPERATIONAL TRANSCONDUCTANCE AMPLIFIER FEEDBACK MECHANISM FOR FIXED FEEDBACK VOLTAGE REGULATORS," filed on Apr. 4, 2011, which is herein incorporated by reference in its entirety.

BACKGROUND OF THE INVENTION

Modern televisions employ many types of voltage regulators in order to generate various power supplies within the television itself. These off-the-shelf power supplies have characteristics that are known and desired vis-à-vis the ways that they perform and interact with other components within the television. Television manufacturers are comfortable with the regulators that they have employed in the past, and can be reluctant to change out this critical part.

Figure 1:
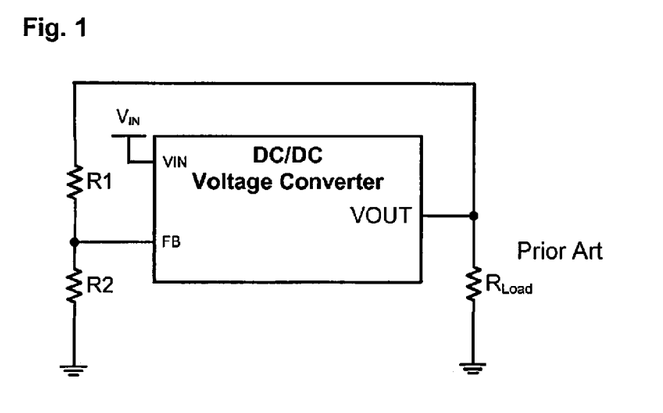
FIG. 1 shows a voltage regulator feedback resistor network with no frequency compensation.
Figure 2:
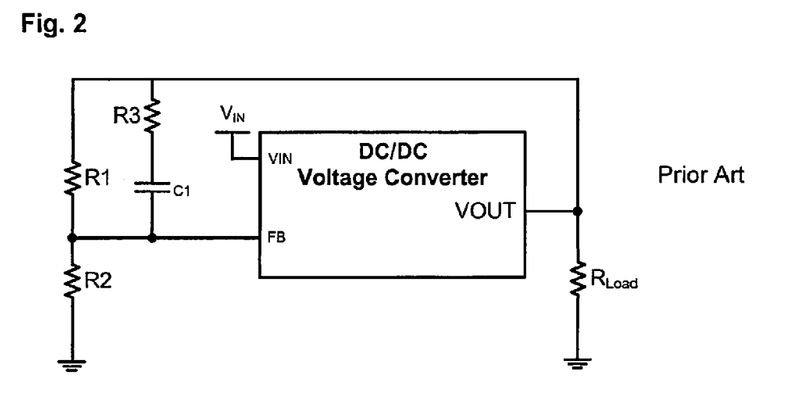
FIG. 2 shows a voltage regulator feedback resistor network with feed forward frequency compensation.
Figure 3:
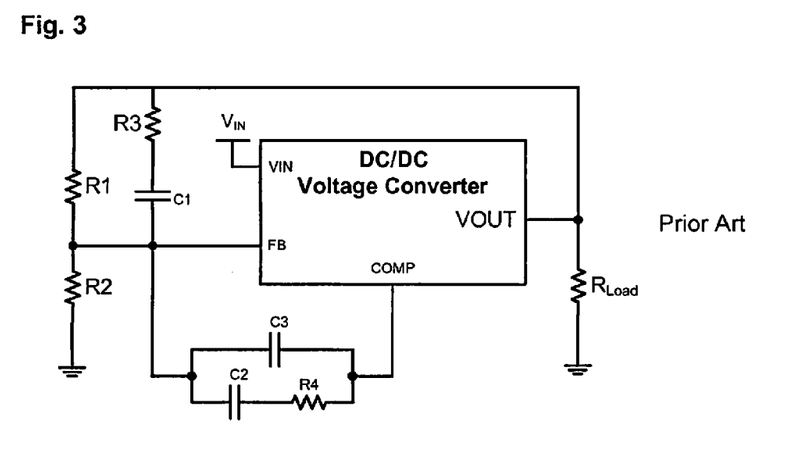
FIG. 3 shows a voltage regulator feedback resistor network with type Ill frequency compensation.

Often, these voltage regulators rely on a resistor divider feedback signal in order to regulate their output voltages, as in FIGS. 1, 2, and 3. (These figures show the power consumer as the simple resistor $R_{Load}$, but the power consumption may be much more complex.) In circuits such as these, as power consumption increases the converter's output voltage naturally falls, the feedback voltage falling along with it. As the output voltage and the feedback voltage fall, the discrepancy in the constant comparison between the feedback voltage and a known voltage within the television or the voltage regulator itself reveals the increased power demand, which in turn causes the power supply to increase its power output. The voltage rises, the feedback voltage rises, and the system heads in the direction towards equilibrium. The process works conversely as power consumption decreases.

Figure 4:
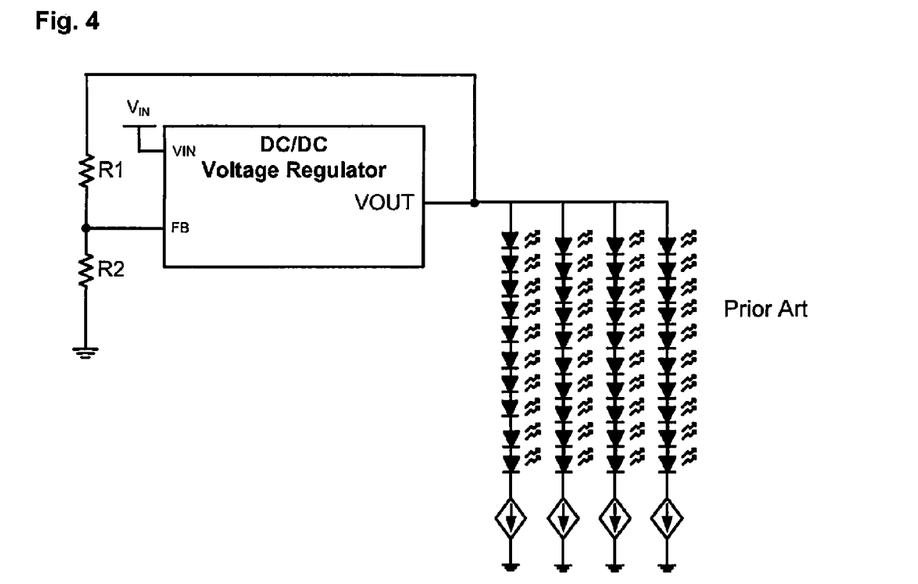
FIG. 4 shows a voltage regulator powering 4 strings of LEDs.

Consider the simple case illustrated in FIG. 4. The simplified display illustrated in FIG. 4 consists of four strings of ten LEDs per string, each string capable of being switched on and off independently of the others. Each string also contains a current sink, ensuring that each illuminated string receives the same amount of current as each other string. This ensures that each illuminated LED produces the same lighting both intensity and color—as all of the others.

Each illuminated LED requires a forward voltage of approximately 3.5 volts, and the current sink requires 1.2 volts in order to operate. Allowing for the vagaries inherent in the LED manufacturing process, each serially connected string requires about 36.2 volts for the 10 LEDs and the current sink. Because the voltage output is (in this case) fixed, in order to ensure sufficient voltage for the operation of the current sinks given the variableness of the LEDs, it would be preferable to allocate about 40 volts.

The typical current that would be desired across the feedback circuitry would be 100 microamps, implying a total resistance (R 1+R2) of 400K ohms. If the feedback voltage that the 40 volt regulator requires is 2.4 volts, we'd use resistors of 376,000 ohms and 24,000 ohms to divide the desired 40.0 volt output into the required 2.4 volts. As the strings switch on and off, the power required from the regulator goes up and down as the regulator keeps the LEDs lit.

There are some real life problems with the way that this circuit accomplishes the task of keeping the lights on. For example, the desired output voltage may not be 40.0 volts. Consider the "average" string of 10 LEDs with the "average" total forward voltage of 35.0 volts. Combined with the 1.2 required voltage drop across the current sink, the total required voltage is only 36.2 volts. With a 40.0 volt supply, all of the extra 3.8 volts worth of power is wasteful (and problematic) heat, dissipated in this example across the current sink. By considering a "worst case LED scenario" rather than an "actual requirement" scenario, excess power is generated and dissipated.

Figure 5:
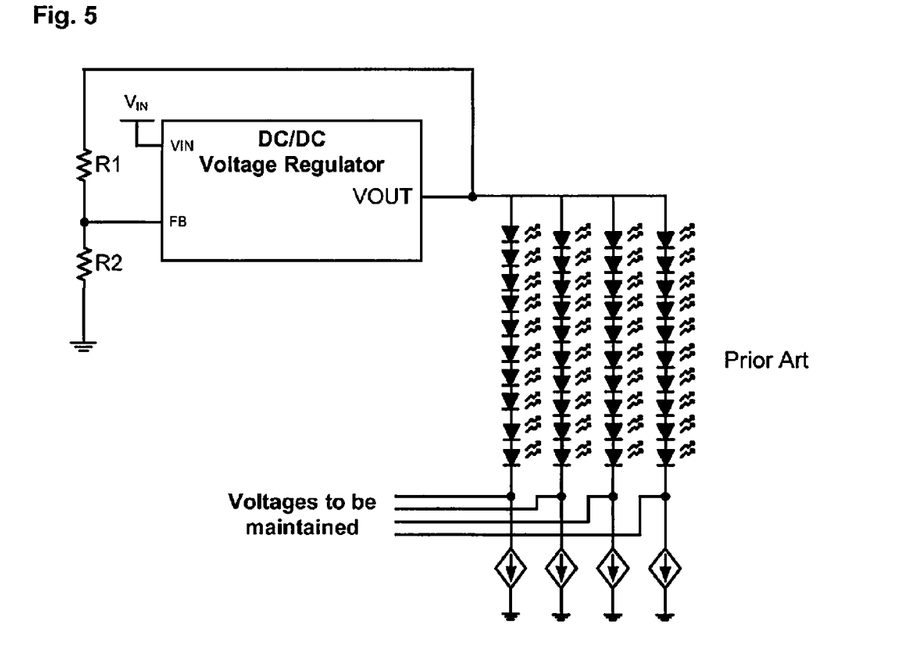
FIG. 5 shows a voltage regulator powering 4 strings of LEDs wherein the pertinent feedback points are indicated.

In addition, measuring the voltage at the "top" of the strings is not optimal—a better method would be to measure the feedback voltage above the current sinks as is pictured in FIG. 5, not above the LEDs as is implicit in FIG. 4. Measuring the voltage across the current sinks, where the excess voltage "accumulates," is a better way to determine the required voltage output from the regulator—the circuit should optimally ensure that there's enough voltage (1.2 volts in this example) across each current sink, not that the LED string sees a fixed voltage. One complication with this methodology is that the circuit needs to know which current sinks are on and which are off at any particular time, as it should only ensure adequate voltage across the "on" current sinks.

And finally, there may be quite a few strings of LEDs, making it difficult to use one integrated circuit to perform the "minimum voltage" comparison. Though FIGS. 4 and 5 show ten strings of LEDs, a typical large television might have one hundred or more strings. It would be preferable to have a solution that scales across a large number of strings, a solution where that comprises a number of control and comparison chips that are linked together rather than one extraordinarily large comparison chip.

What is needed is a method for adapting these legacy voltage regulators for use in systems with variable voltage requirements that must be measured in a number of different places within the circuitry.

SUMMARY OF THE INVENTION

The invention provides a method for manipulating the feedback voltage input into a legacy voltage regulator in order to direct the converter to alter its output voltage. It is scalable to allow its application in different devices that might contain widely varying numbers of LED strings.

The invention comprises two important parts that work with the legacy voltage regulator. First, the invention uses a series of serially connected integrated circuits (herein referred to as controllers) to tabulate the current "lowest voltage." The first controller measures a set number of voltages, determines the lowest voltage from these measurements, and then passes that lowest voltage to the next controller in the series. Each successive controller compares each of its measurements to each other and the one lowest measurement from the previous controller and passes the "new" lowest voltage to the next controller in the series. The output of the final controller is then the lowest voltage in from the set of all of the voltages that are being compared. Assuming that the lowest voltage is above the required voltage, the voltage regulator is producing sufficient power to operate the LEDs.

One extension to the invention allows the serially connected controllers to consider statuses as well as voltages. This distinction is useful when a particular LED string might be off, and thus have an irrelevant voltage. In this case, the extended invention would allow the irrelevant voltage to be effectively ignored. For example, if the statuses of the strings were either ACTIVE or INACTIVE, the various controllers would consider only the voltages on the ACTIVE strings as the lowest voltage is tabulated from one controller to the next.

By passing an ACTIVE status to the succeeding controller, each controller can indicate that at least one of its monitored strings—or at least one monitored string from a preceding controller—was ACTIVE and had a correspondingly useful voltage.

The invention also comprises an operational transconductance amplifier, or OTA. The OTA compares the lowest voltage from the series of serially connected integrated circuits to the known voltage required for the current sinks to operate. Then, it produces an output current that is proportional to the difference and injects that current into the feedback mechanism of the voltage regulator. When the lowest voltage is above the required voltage, the OTA produces current that raises the feedback voltage, causing the voltage regulator to lower its power output. The OTA can be tuned for specific applications, and generally, the higher the difference, the more current the OTA produces.

Conversely, when the voltage regulator is producing insufficient power, and the voltage across the current sinks drops to levels below the required voltage, the OTA can remove current from the feedback mechanism, causing the voltage regulator to raise its power output. The higher the deficit, the more current removed and the lower the feedback voltage becomes.

DETAILED DESCRIPTION OF THE PREFERRED EMBODIMENTS

Figure 6:
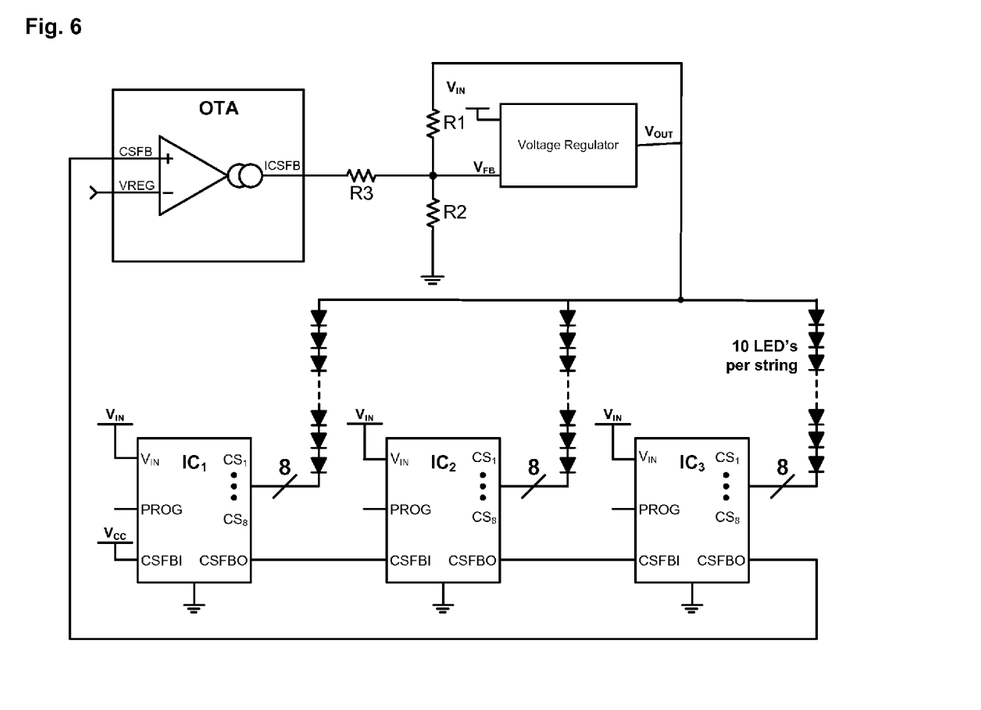
FIG. 6 shows a first embodiment of the invention with no frequency compensation in the feedback resistor network.

FIG. 6 shows a schematic of an embodiment of the invention that contains one voltage regulator, one operational transconductance amplifier, three integrated circuits, each integrated circuit controlling eight strings of ten LEDs per string, and three resistors used to control both the feedback mechanism of the voltage regulator and the interaction between the voltage regulator and the operational transconductance amplifier. In this embodiment, much of the functionality of measuring the voltages, comparing the voltages is contained within the three integrated circuits. These three integrated circuits also contain the current sinks that control the current through the LEDs—one current sink per string. This embodiment would be contained within a television that uses the strings of LEDs as a backlight device.

The integrated circuits also control, via commands from the enclosing television, each of the 24 strings of LEDs, turning them on or off, or dimming them via a PWM mechanism internal to the individual integrated circuits, as requested by the television. The television can use any of a number of different methods to communicate with the integrated circuit as it pertains to the control of the current sinks. In this embodiment, a simple one-wire, serial interface is used.

The LED strings are composed of LEDs that have forward voltages of approximately 3.5 volts per LED, so each string of ten LEDs will have a forward voltage of approximately 35 volts. The current sinks that are part of the three integrated circuits, one current sink per LED string, typically require approximately 1.2 volts to function, so the total approximate required voltage for each channel, composed of one, ten LED string and one current sink, is approximately 36.2 volts. LED manufacturing process variations and the placement of particular LEDs on particular strings cause variations in the required voltages from channel to channel, so the range in the case of this television could be as wide as four volts, from 34 to 38 volts, but it is the voltage across the current sinks (the 1.2 required volts) that is important here. The three integrated circuits communicate serially to determine the lowest voltage across an individual current sink on any of the active LED strings, with the last integrated circuit in the series returning the lowest voltage to the operational transconductance amplifier.

The regulator is a "typical" 24 volt to 40 volt DC-to-DC converter, though the embodiment here will require only 36.2 volts of output. External to the drawing is an AC-to-DC converter whose output is 24 volts DC.

The typical current across the feedback circuitry of the DC-to-DC converter would be 100 microamps, implying a total resistance (R1+R2) of 362K ohms. The desired feedback Voltage—when the DC-to-DC converter is producing a minimum of 1.2 volts across any of the active current sinks—would be 2.4 volts, resulting in resistor values of 338K ohms for R 1, and 24K ohms for R2.

Figure 7:
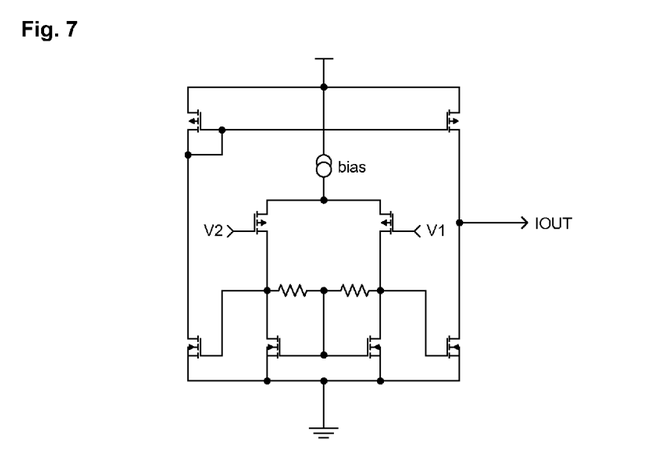
FIG. 7 shows the construction of a typical operational transconductance amplifier.
Figure 8:
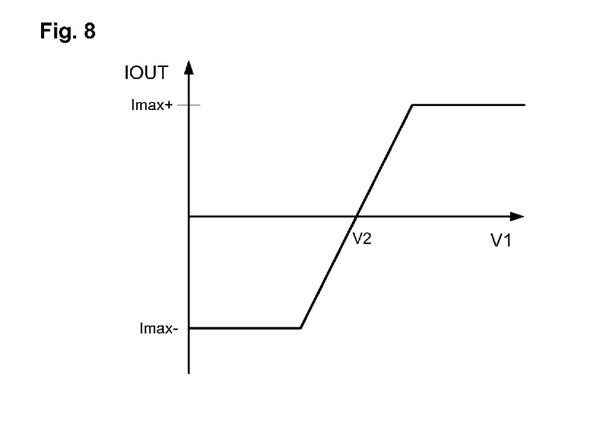
FIG. 8 shows a graph of current versus voltage differential for a typical operational transconductance amplifier.

The operational transconductance amplifier compares the lowest voltage across any of the active current sinks (the voltage returned by the three integrated circuits) to a reference voltage that corresponds to the minimum voltage required to power a current sink ($V_{REG}$—in this case, 1.2 volts) and outputs a current that is proportional to the difference as is shown in FIG. 8. The OTA would have a maximum current output of Imax+ and a minimum output of Imax−. The OTA is built via FIG. 7.

In this embodiment, the "current bounds" of the OTA (FIG. 8, Imax+ and Imax−) are higher than the network of R1 and R2, and the DC-to-DC converter can manage. In some situations, using a pre-existing, already designed OTA within this circuit could feed too much positive or negative current into the surrounding circuit, overpowering the feedback voltage beyond the ability of the DC-to-DC converter to be able to manage. That is, the feedback mechanism of the DC-to-DC converter in the circuit could be overwhelmed by the OTA's Imax+ and Imax− current. R3 is installed in the circuit in order to eliminate this possibility, the OTA's ability to drive the feedback past the ability of the DC-to-DC converter to manage. The ratio of R3 to R1 and R2 will define the bounds of the OTA's ability to raise and lower VFB, but a typical value for R3 in his situation would be 140K ohms.

This embodiment also contains a number of related components that provide context within which the invention operates. The television contains an internal power supply, typically an AC-to-DC supply that provides a specific voltage output. In the case of this embodiment, the power supply provides 24 volts, though other AC-to-DC power supplies are often found in televisions, providing DC voltage outputs that are both higher and lower than the voltage required by the LED strings.

The DC-to-DC converter requires 3 major inputs: the 24 volt input from the television's power supply, the reference voltage from the television that indicates the voltage required for the current sinks to operate as explained previously, and a feedback voltage that indicates the minimum voltage being supplied to the current sinks.

Figure 9:
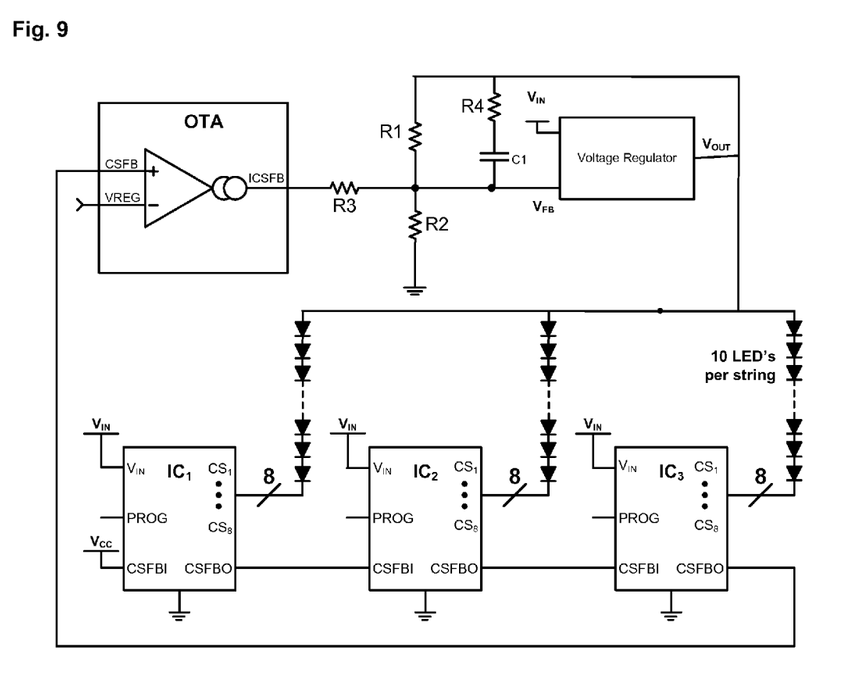
FIG. 9 shows a second embodiment of the invention with feed forward frequency compensation in the feedback resistor network.
Figure 10:
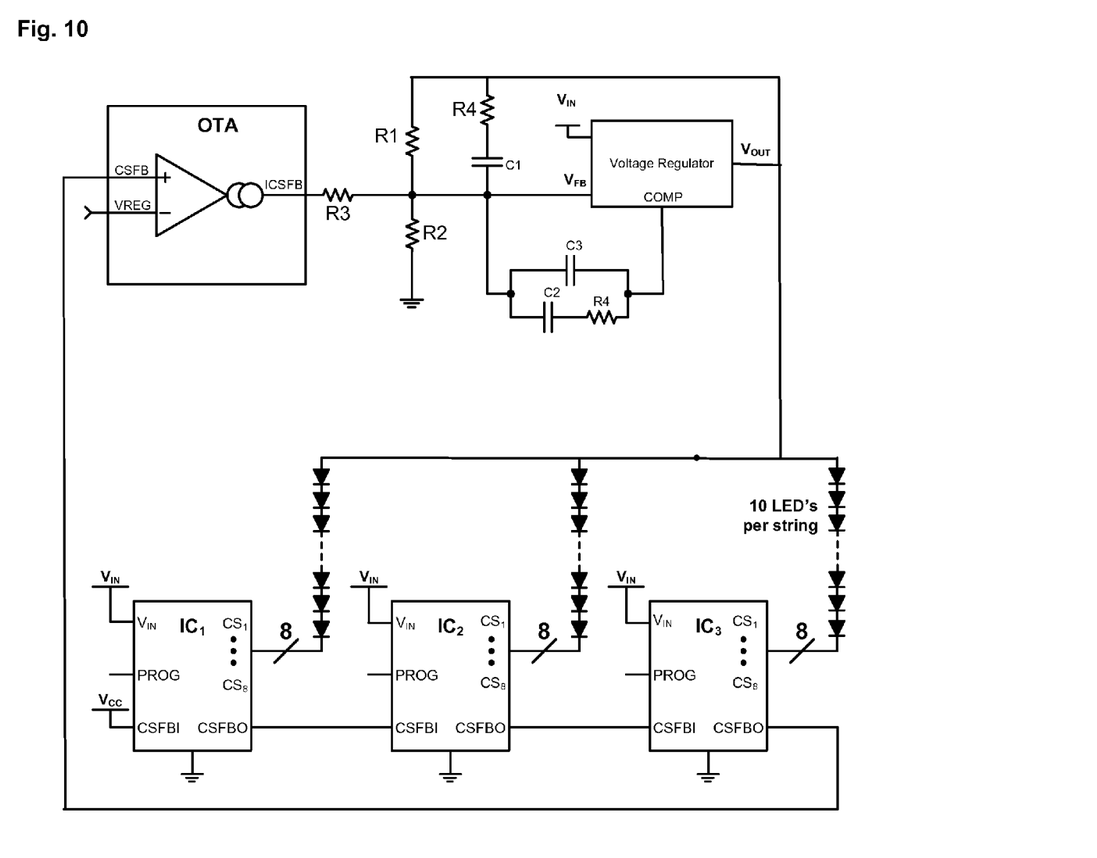
FIG. 10 shows a third embodiment of the invention with type Ill frequency compensation in the feedback resistor network.

Other embodiments are possible. FIG. 9 shows another embodiment wherein the feedback mechanism of the voltage regulator compromises feed forward frequency compensation in the feedback resistor network. FIG. 10 shows another embodiment wherein the feedback mechanism of the voltage regulator additionally comprises type III frequency compensation in the feedback resistor network.

Presuming that the television has an AC source as its ultimate power source, the decision to use a single AC-to-DC (110V AC to 40V DC) voltage regulator as opposed to a combination of one AC-to-DC regulator (to convert 110V AC to 24V DC) and then one DC-to-DC regulator (to convert 24V DC to 40V DC) would be the television manufacturer's to make. The invention functions similarly in either case, with the OTA feedback mechanism connected to the regulator that directly powers the LEDs. (In the case of a two regulator system, there is generally an additional feedback mechanism on the "outer" AC-to-DC regulator. That feedback mechanism could be integral to the AC-to-DC converter.)

In addition, it would be possible to bypass the combination of an AC-to-DC converter and a DC-to-DC converter altogether, instead utilizing a power supply that took a wall voltage (for example, 120 VAC) and converted it directly into the 40 volts required by the television, assuming that the power supply utilized the voltage feedback mechanism described here.

What is claimed is:

1. A voltage regulation circuit comprising:
    a plurality of controllers connected in a series, the plurality of controllers including a first controller and a last controller, the first controller in the series being configured to provide a summary voltage equal to one of a first set of voltages monitored by the first controller, each respective controller other than the first controller being configured to provide a respective summary voltage equal to one of the respective summary voltage provided by a preceding controller in the series and one of a second set of voltages monitored by the respective controller;
    an amplifier having a first input coupled to the last controller in the series, a second input to receive a reference voltage, and an output, the amplifier being configured to generate an output current in proportion to a difference between the respective summary voltage provided by the last controller and the reference voltage; and
    a DC-to-DC voltage regulator having an input and an output, the input being coupled to the output of the amplifier, the voltage regulator providing a regulated output voltage based on the output current of the amplifier.

2. The voltage regulation circuit of claim 1 further comprising a feedback network coupled between the output of the voltage regulator and the input of the voltage regulator.

3. The voltage regulation circuit of claim 2 wherein the feedback network includes a first resistor coupled between the output of the voltage regulator and the input of the voltage regulator and a second resistor coupled between the input of the voltage regulator and ground.

4. The voltage regulation circuit of claim 3 wherein the feedback network further includes a third resistor coupled between the output of the amplifier and an input of the voltage regulator.

5. The voltage regulation circuit of claim 4 wherein the feedback network further includes a fourth resistor coupled in series with a capacitor between the output of the voltage regulator and the input of the voltage regulator.

6. The voltage regulation circuit of claim 5 wherein the voltage regulator includes a frequency compensation input, the feedback network further including a fifth resistor coupled in series with a second capacitor between the input of the voltage regulator and the frequency compensation input of the voltage regulator and a sixth resistor coupled in parallel with the fifth resistor and the second capacitor.

7. The voltage regulation circuit of claim 2 wherein the feedback network includes feed-forward frequency compensation.

8. The voltage regulation circuit of claim 2 wherein the feedback network includes type III frequency compensation.

9. The voltage regulation circuit of claim 1 wherein the voltage regulator is a DC-to-DC voltage regulator.

10. The voltage regulation circuit of claim 1 wherein the voltage regulator is an AC-to-DC voltage regulator.

11. The voltage regulation circuit of claim 1 wherein the first controller is further configured to provide a summary status equal to one of a first set of statuses monitored by the first controller, and each respective controller other than the first controller is further configured to provide a respective summary status be equal to one of the respective summary status provided by the preceding controller in the series and one of a second set of statuses monitored by the respective controller.

12. The voltage regulation circuit of claim 11 further comprising a feedback network coupled between the output and the input of the voltage regulator.

13. The voltage regulation circuit of claim 12 wherein the feedback network includes feed-forward frequency compensation.

14. The voltage regulation circuit of claim 12 wherein the feedback network includes type III frequency compensation.

15. The voltage regulation circuit of claim 12 wherein the feedback network includes a first resistor coupled between the output and the input of the voltage regulator, a second resistor coupled between the input of the voltage regulator and ground, and a third resistor coupled between the output of the amplifier and an input of the voltage regulator.

16. A method of regulating an output voltage of a voltage regulator in response to voltages monitored by a plurality of controllers connected in a series, the method comprising:
    monitoring, by each respective controller, a respective set of voltages;
    selecting, by a first controller in the series, a first summary voltage from the respective set of voltages monitored by the first controller;
    selecting, by each respective controller other than the first controller, a respective summary voltage equal to one of the respective summary voltage selected by a preceding controller in the series and a voltage from the respective set of voltages monitored by the respective controller;
    generating a current that is proportional to a difference between the respective summary voltage selected by a last controller in the series and a reference voltage;
    altering the feedback voltage of a voltage regulator based on the current; and
    regulating the output voltage of the voltage regulator in response to the feedback voltage.

17. The method of claim 16 further comprising compensating a frequency of the feedback voltage.

18. The method of claim 16 wherein regulating the output voltage of the voltage regulator includes regulating a DC output voltage of the voltage regulator in response to the feedback voltage and an AC input voltage provided to the voltage regulator.

19. The method of claim 16 wherein regulating the output voltage of the voltage regulator includes regulating a DC output voltage of the voltage regulator in response to the feedback voltage and a DC input voltage provided to the voltage regulator.

20. The method of claim 16 further comprising:
monitoring, by each respective controller, a respective set of statuses;
selecting, by the first controller in the series, a first summary status from the respective set of statuses monitored by the first controller; and
selecting, by each respective controller other than the first controller, a respective summary status equal to one of the respective summary status selected by the preceding controller in the series and a status from the respective set of statuses monitored by the respective controller.

\* \* \* \* \*